United States Patent [19]
Gleason

[11] Patent Number: 5,344,000
[45] Date of Patent: Sep. 6, 1994

[54] BELT CLEANER

[75] Inventor: Dennis L. Gleason, Kentwood, Mich.

[73] Assignee: Clipper Belt Lacecer Company, Grand Rapids, Mich.

[21] Appl. No.: 174,200

[22] Filed: Dec. 27, 1993

[51] Int. Cl.$^5$ .............................................. B65G 45/16
[52] U.S. Cl. .................................... 198/499; 198/497
[58] Field of Search ............... 198/497, 499; 15/256.5, 15/256.51

[56] References Cited

U.S. PATENT DOCUMENTS

| | | | |
|---|---|---|---|
| 3,866,266 | 2/1975 | Dunlap | 15/256.51 |
| 4,105,109 | 8/1978 | Schultz | 198/499 |
| 4,189,046 | 2/1980 | Ward et al. | 198/499 |
| 4,402,394 | 9/1983 | Stoll | 198/499 |
| 4,696,388 | 9/1987 | Stoll | 198/493 |
| 4,802,928 | 2/1989 | Dunlap | 134/15 |
| 4,836,356 | 6/1989 | Mukai et al. | 198/499 |
| 4,915,211 | 4/1990 | Dohmeier | 198/499 |
| 4,936,439 | 6/1990 | Alexander, Jr. et al. | 198/499 |
| 4,987,993 | 1/1991 | Dohmeier | 198/499 |
| 5,161,669 | 11/1992 | Gibson, Jr. | 198/499 |
| 5,201,402 | 4/1993 | Mott | 198/499 |

*Primary Examiner*—James R. Bidwell
*Attorney, Agent, or Firm*—Price, Heneveld, Cooper, DeWitt & Litton

[57] ABSTRACT

A scraper for cleaning conveyor belts and the like includes an elongate blade holder with at least two support pins therein, and an elongate blade slidably received in a slot in the holder. The blade has an outer edge shaped for scraping a belt, and an inner edge abuttingly supported on the support pins at locations spaced a predetermined distance inwardly from the opposite ends of the blade. The blade is resiliently flexible along its length, such that as contact between the outer edge of the blade and the belt wears away the center portion of the blade, the end portions of the blade are flexed back about the support pins in the direction away from the belt, thereby bowing the center portion of the blade inwardly toward the belt for improved conformance and cleaning performance.

24 Claims, 3 Drawing Sheets

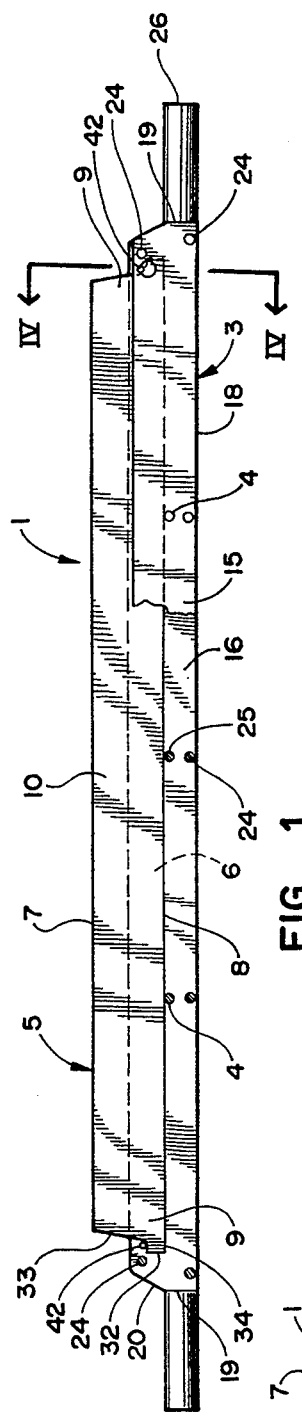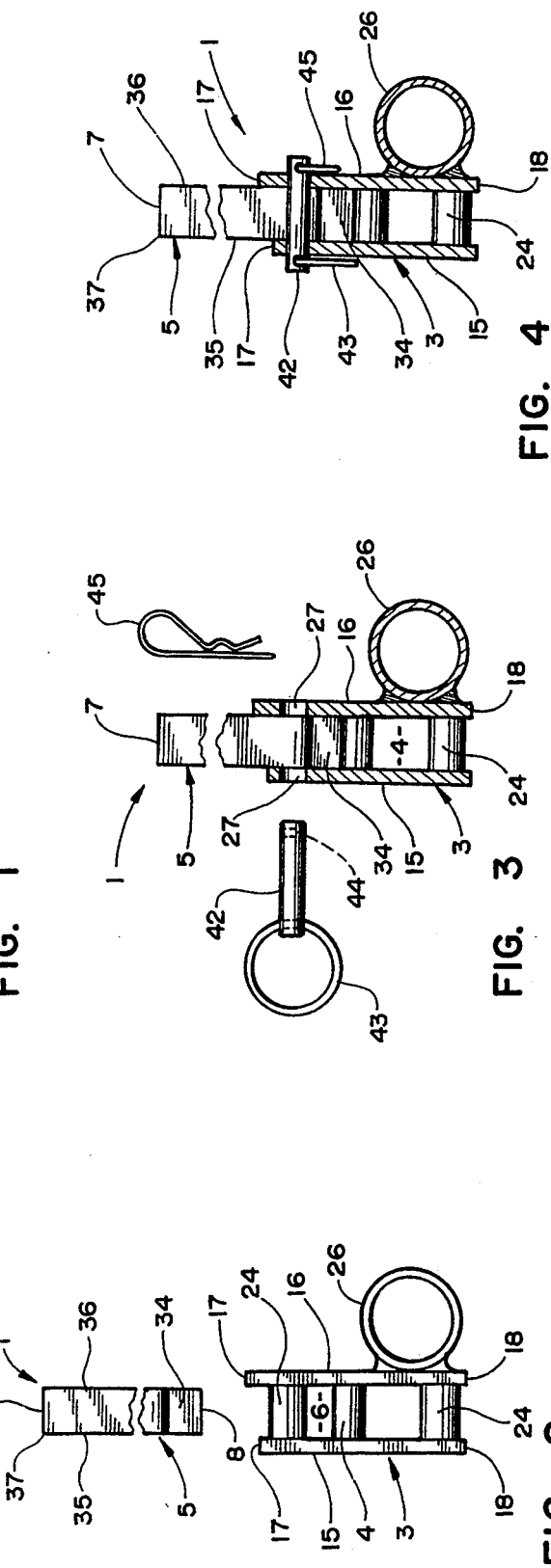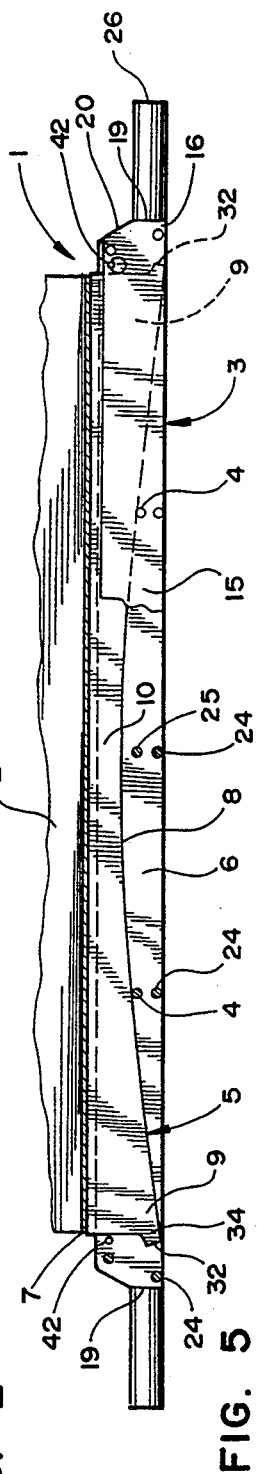

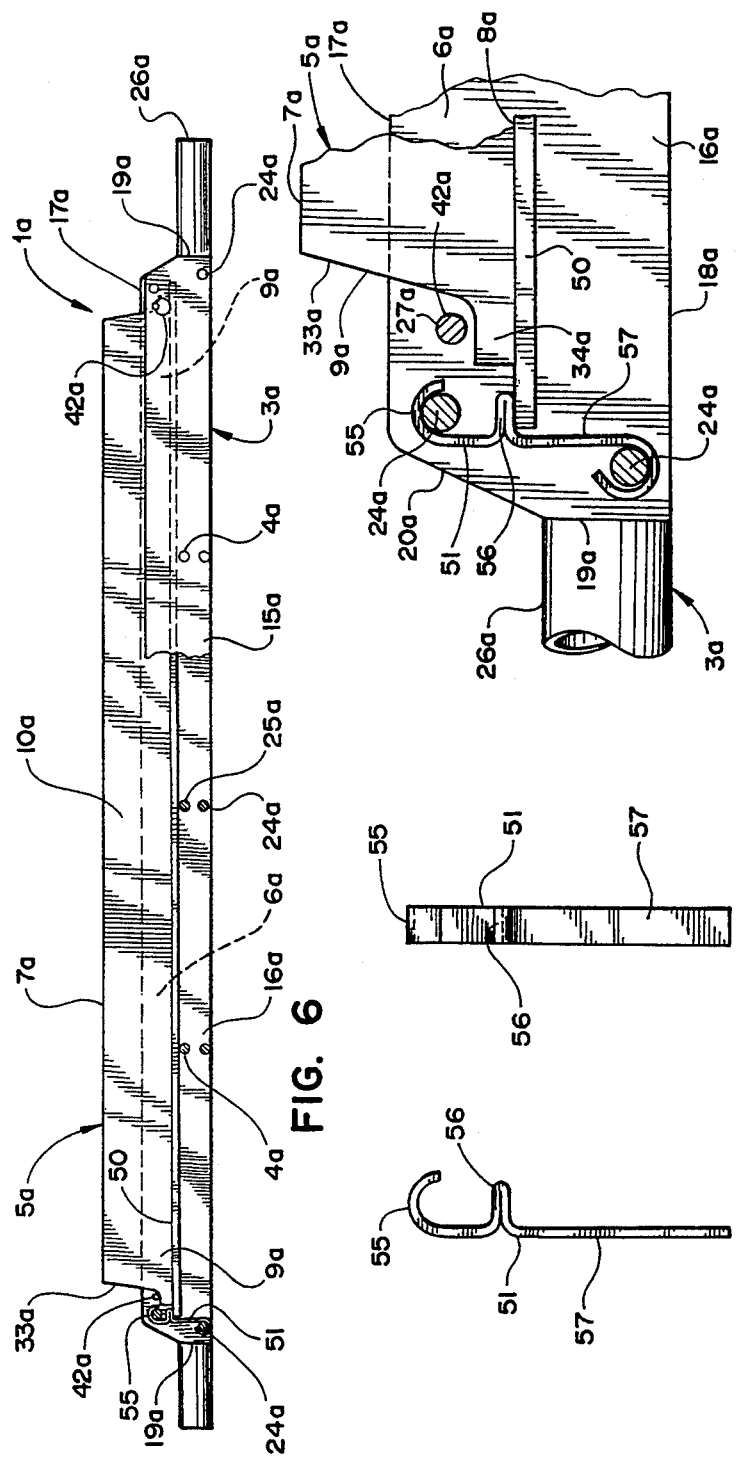
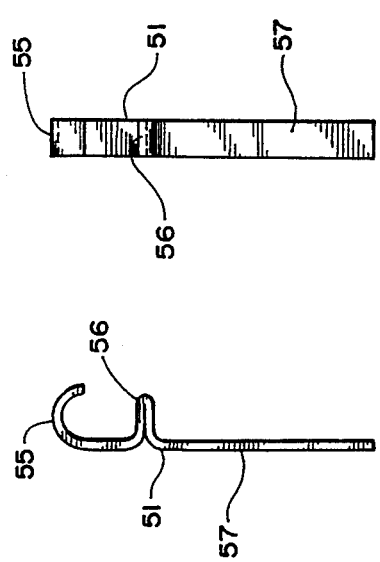
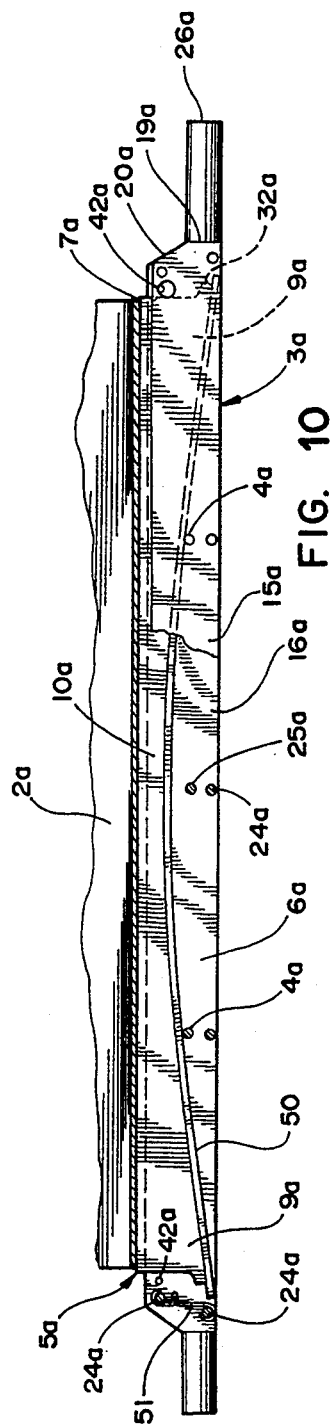

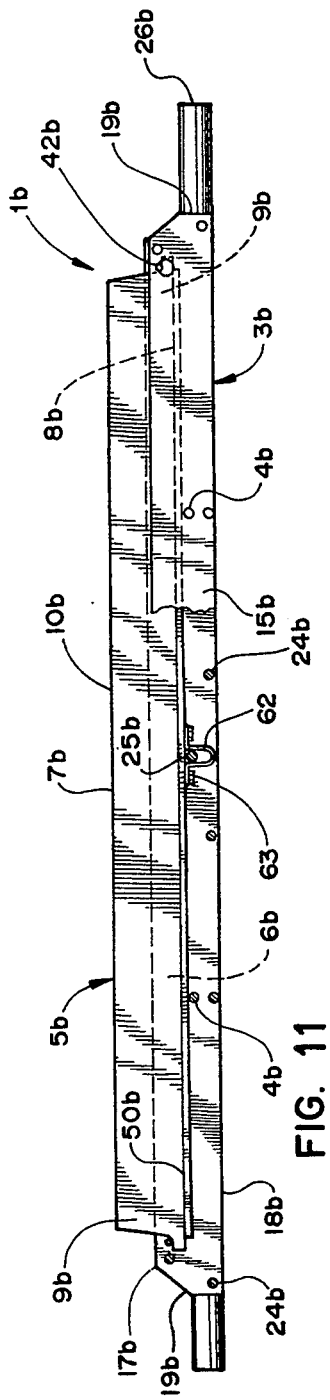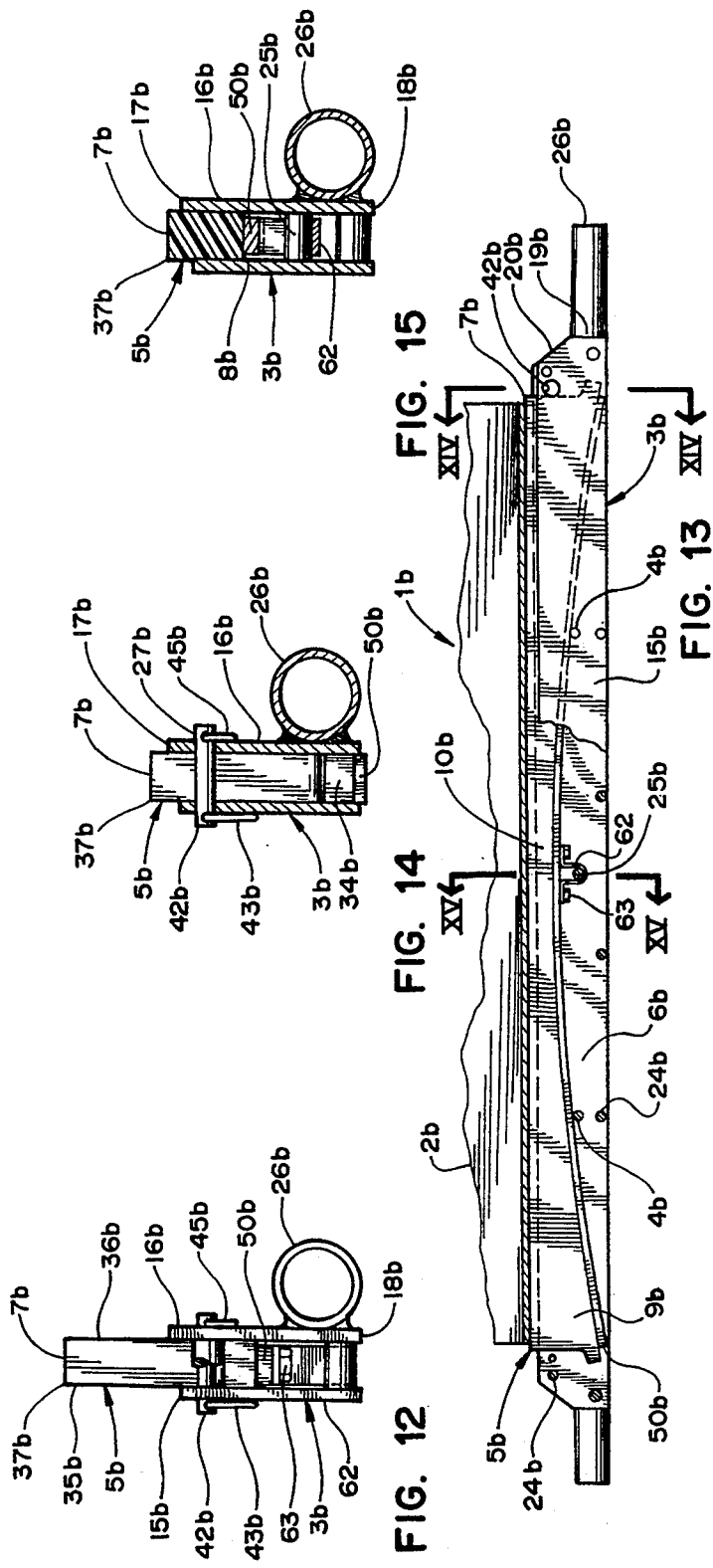

BELT CLEANER

BACKGROUND OF THE INVENTION

The present invention relates to cleaners for conveyor belts and the like, and in particular to a conforming scraper arrangement therefor.

Cleaners for conveyors are generally well-known in the art, and are typically used to remove debris and other similar materials from various forms of material conveying systems, such as conveyor belts, and the like. Some types of belt cleaners employ a blade to scrape the debris from the belt adjacent the upstream end of its return side, so as to improve transport efficiency and to simplify debris collection and removal. Examples of such scraper mechanisms are disclosed in U.S. Pat. Nos. 4,189,046; 4,402,394 and 4,936,439, which are hereby incorporated herein by reference.

In many heavy duty commercial installations, such as at coal mines, rock quarries, etc., the debris from the conveyed material is quite abrasive, thereby causing the scraper blades to wear very quickly. Also, since a majority of the debris on heavy duty conveyor belts collects in the center portion of the belt, the scraper blades tend to wear unevenly, with the center portion of the scraper blade typically wearing much more rapidly than the end portions of the scraper blade. These factors often result in poor cleaning performance, since scraper contact with the belt is non-uniform, and a significant maintenance problem is created, insofar as worn blades must be constantly replaced, sometimes under very difficult circumstances, such as in underground mines.

SUMMARY OF THE INVENTION

One aspect of the present invention is to provide a scraper for cleaning conveyor belts and the like, which includes an elongate holder including mutually parallel front and rear plates defining a groove therebetween, and at least two support pins extending between the front and rear plates at locations disposed a predetermined distance inwardly from the opposite ends of the holder. An elongate blade is mounted in the holder, and has opposite side faces closely received in the groove of the holder for sliding movement therein, and opposite end portions positioned adjacent to the opposite ends of the holder. The blade has an outer edge shaped for scraping a belt, an opposite inner edge abuttingly supported on the support pins at locations thereon spaced a predetermined distance inwardly from the opposite end portions of the blade, and a center portion disposed generally centrally in the holder. The blade is resiliently flexible along its length, such that as contact between the outer edge of the blade and the belt wears away the center portion of the blade, the end portions of the blade are flexed back about the support pins in a direction away from the belt, thereby bowing the center portion of the blade inwardly toward the belt for improved conformance and cleaning performance.

Preferably, the scraper includes a quick-change type of fastener system to retain the blade in the holder, which permits the blade to be easily removed and replaced without tools. The quick-change fastener system is quite reliable, and is not adversely effected by even large build ups of debris and/or rust on the scraper, and is resistant to damage and/or jamming.

Another aspect of the present invention is to provide a scraper blade for conveyor belt cleaners and the like of the type that includes a slotted blade holder with at least two support pins disposed inwardly from opposite ends of the holder. The blade has opposite side faces shaped to be closely received in the holder for sliding movement therein, as well as opposite end portions with outwardly extending tabs for engaging fasteners to retain the blade in the holder. The blade has an outer edge shaped for scraping a belt, and an opposite inner edge shaped for abutting support on the support pins at locations spaced inwardly from the opposite end portions of the blade. The blade is resiliently flexible along its length, whereby as contact between the outer edge of the blade and the belt wears away the center portion of the blade, the end portions of the blade are flexed back about the support pins in a direction away from the belt, thereby bowing the center portion of the blade inwardly toward the belt for improved conformance and cleaning performance.

The principal objects of the present invention are to provide a conforming belt cleaner which has improved cleaning performance and efficiency. The blade is resiliently flexible along its length, and bows over holder support pins as the blade wears away to bow the center portion of the blade inwardly to achieve better conformance with the belt. A quick-change fastener system retains the blade in the holder, and is readily detachable to facilitate easy removal and replacement of the blade by even unskilled personnel without tools. The belt cleaner is also very durable, and has an uncomplicated design, which renders it particularly resistant to damage and/or jamming by debris, rocks, and the like. The belt cleaner is efficient in use, economical to manufacture, capable of a long operation life, and particularly well adapted for the proposed use.

These and other advantages will be further understood and appreciated by those skilled in the art by reference to the following written specification, claims and appended drawings.

BRIEF DESCRIPTION OF THE DRAWINGS

FIG. 1 is a front elevational view of a scraper embodying the present invention, wherein a holder portion thereof has been broken away to reveal internal construction.

FIG. 2 is an exploded, side elevational view of the scraper, wherein a blade portion thereof and the holder are shown in a disassembled condition.

FIG. 3 is an exploded, side elevational view of the scraper, wherein the blade is shown inserted into the holder, and a retainer pin is shown in a disassembled condition.

FIG. 4 is a vertical cross-sectional view of the scraper, shown in a fully assembled condition, taken along the line IV—IV, FIG. 1.

FIG. 5 is a front elevational view of the scraper, shown in a worn condition abutting an associated conveyor belt, wherein a portion of the holder has been broken away to reveal internal construction.

FIG. 6 is a front elevational view of another embodiment of the present invention having a booster spring associated therewith, wherein a holder portion thereof has been broken away to reveal internal construction.

FIG. 7 is a side elevational view of a spring retainer associated with the scraper illustrated in FIG. 6, shown in a preassembled condition.

FIG. 8 is a front elevational view of the spring retainer shown in FIG. 7.

FIG. 9 is an enlarged, fragmentary vertical cross-sectional view of the scraper illustrated in FIG. 6, wherein the spring retainer is shown holding the booster spring in the holder.

FIG. 10 is a front elevational view of the scraper illustrated in FIG. 6, shown in a worn condition abutting an associated conveyor belt, wherein a portion of the holder has been broken away to reveal internal construction.

FIG. 11 is a front elevational view of another embodiment of the present invention, having a blade and center mounted booster spring associated therewith, wherein a holder portion thereof has been broken away to reveal internal construction.

FIG. 12 is an end elevational view of the scraper illustrated in FIG. 11, wherein a support pin portion thereof has been broken away to reveal internal construction.

FIG. 13 is a front elevational view of the scraper illustrated in FIG. 11, shown in a worn condition abutting an associated conveyor belt, wherein a portion of the holder has been broken away to reveal internal construction.

FIG. 14 is a vertical cross-sectional view of the scraper illustrated in FIG. 11, taken along the line XIV—XIV, FIG. 13.

FIG. 15 is a vertical cross-sectional view of the scraper illustrated in FIG. 11, taken along the line XV—XV, FIG. 13.

DETAILED DESCRIPTION OF THE PREFERRED EMBODIMENTS

For purposes of description herein, the terms "upper", "lower", "right", "left" "rear", "front" "vertical", "horizontal", and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIG. 1) generally designates a scraper embodying the present invention. Scraper 1 is particularly adapted to clean conveyor mechanisms and the like, such as the illustrated conveyor belt 2 (FIG. 5). Scraper 1 includes an elongate blade holder 3 with at least two support pins 4 therein, and an elongate blade 5 slidably received in a slot 6 in holder 3. Blade 5 has an outer edge 7 shaped for scraping conveyor belt 2, and an inner edge 8 abuttingly supported on support pins 4 at locations spaced a predetermined distance inwardly from opposite end portions 9 of blade 5. The blade 5 is resiliently flexible along its length, such that as contact between the outer edge 7 of blade 5 and conveyor belt 2 wears away the center portion 10 of blade 5, as shown in FIG. 5, the end portions 9 of blade 5 are flexed back about support pins 4 in a direction away from the conveyor belt 2, thereby bowing the center portion 10 of belt 5 inwardly toward the conveyor belt 2 for improved conformance and cleaning performance.

With reference to FIGS. 1-5, the illustrated blade holder 3 includes a front plate 15 and a rear plate 16, which are interconnected in a mutually parallel, spaced apart relationship, so as to form slot 6 therebetween. Front plate 15 and rear plate 16 are similarly shaped, with a generally rectangular plan configuration, wherein each plate includes an upper edge 17, a lower edge 18, and opposite end edges 19 with inwardly tapered upper or outer portions 20. The lower edges 18 of front and rear plates 15 and 16 are generally aligned, and the width of rear plate 16 is slightly greater than that of front plate 15, such that the upper edge 17 of rear plate 16 extends outwardly from the upper edge 17 of front plate 15. Rear plate 16 is normally oriented toward the trailing side of scraper 1, whereas front plate 15 is normally oriented toward the leading side of scraper 1.

In the example shown in FIGS. 1-5, ten shouldered spacers 24 are provided to fixedly interconnect front and rear plates 15 and 16 in a spaced apart relationship. Spacers 24 extend between holder plates 15 and 16, and have opposite ends attached thereto by plug welding, or the like. Five of the spacers 24 are positioned generally along the lower edges 18 of front and rear plates 15 and 16, and two of the spacers 24 are positioned adjacent the upper edges 17 of front and rear plates 16 adjacent end edges 20. Three of the spacers 24 are located adjacent the central portions of front and rear plates 15 and 16, and define backer pins, comprising two end support pins 4, and a single center support pin 25, which function in the manner described in greater detail hereinafter. The backer support pins 4 and 25 are arranged in a colinear relationship along holder slot 6, with each end support pin 4 being disposed a predetermined distance inwardly from the next adjacent end of holder 4, so that the opposite ends of blade 5 are supported in a cantilevered fashion. Preferably, the end support pins 4 are positioned in holder 4 such that the distance between each of the end support pins 4 and the adjacent end portion of the blade 5 is equal to at least ten percent of the overall width of blade 5, as measured along its outer edge 7, and a range of around 20–40 percent of the overall width of blade 5 has been found to be satisfactory. In the illustrated example, the distance between end support pins 4 and the end edge 33 of blade 5 is equal to around 25 percent of the overall width of blade 5.

A support pipe or tube 26 is fixedly attached to the exterior side of rear plate 16 along the lower edge 18 thereof, and is adapted to mount scraper 1 to an associated scraper mechanism (not shown), such as the mechanisms disclosed in previously referenced U.S. Pat. Nos. 4,189,046; 4,402,394 and 4,936,439. Two pairs of aligned fastener apertures 27 extend through front and rear plates 15 and 16, adjacent the opposite inclined end edges 20, and are adapted to closely receive fasteners therein to retain blade 5 in holder 3, as set forth below.

Scraper blade 5 (FIGS. 1-5) has an elongate shape with a generally rectangular plan configuration, comprising outer edge 7 which is shaped for scraping conveyor belt 2, inner edge 8 which is shaped for abutting support on support pins 4 and 25, and opposite end edges 32, which include inwardly tapered outer portions 33. The opposite end edges 32 of blade 5 are shaped so as to form outwardly projecting tabs 34, which facilitate removably mounting blade 5 in holder 3 in the fashion described below. Blade 5 is generally flat, and defines oppositely oriented parallel planar faces 35 and 36. The inner edge 8 of the illustrated blade 5 is flat, and is disposed perpendicular to blade faces 35 and 36, and the outer edge 7 of blade 5 is also flat, and forms a leading edge 37 at the front face 35 of blade 5. The outer edge 7 of blade 5 may also be slightly angled in the nature of five to twenty degrees. The illustrated blade 5 is preferably constructed from a synthetic resin material, such as polyurethane, or the like, such that it is quite durable, yet resiliently flexible along its length.

A pair of quick-release retainer pins 42 (FIGS. 1–5) are provided to securely retain blade 5 in holder 3 in a quick-disconnect fashion, so as to permit easy removal and replacement of blade 5 without tools by even unskilled personnel. Retainer pins 42 include a ring 43 adjacent one end thereof to facilitate grasping the same, and a radially extending aperture 44 through the opposite end thereof. Retainer pin 42 has a generally cylindrical construction, and is shaped to be closely received within the aligned fastener apertures 27 in holder plates 15 and 16, as shown in FIGS. 3 and 4. When retainer pins 42 are fully inserted into the aligned fastener apertures 27 in holder plates 15 and 16, the retainer pins 42 are positioned immediately adjacent the end tabs 34 on blade 5, thereby capturing blade 5 in holder 3 inbetween the two retainer pins 42, and the three support pins 4 and 25. Each retainer pin 42 includes a hair pin clip 45, which is received through the fastener aperture 44 in retainer pin 42, so as to positively prevent pins 42 from being inadvertently removed from blade holder 5, yet permitting easy removal of pins 42 for replacement of blade 5.

In operation, scraper 1 is assembled on an associated scraper mechanism (not shown), and adjusted so that the outer edge 7 of blade 5 comes into full contact with the exterior or conveying surface of conveyor belt 2. When the blade 5 is new, as shown in FIG. 1, the inner edge 8 of blade 5 is abuttingly supported on the two end support pins 4 and the center support pin 25. Blade 5 is free to flex about support pins 4 and 25 by a sliding motion between holder plates 15 and 16. The center support pin 25 provides positive support for blade 5 at the critical center portion 10 thereof during the initial break-in of blade 5. Because of the abrasive nature of the debris being scraped from conveyor belt 2, the outer edge 7 of blade 5 is worn away during use. The debris on conveyor belt 2 is typically concentrated near its center portion, such that the center portion 10 of blade 5 will normally wear away faster than the end portions 9 of blade 5, which is the condition illustrated in FIG. 5.

As the center portion 10 of blade 5 is worn away faster than the end portions 9 thereof, the resilient flexibility of blade 5 is such that the end portions 9 of blade 5 are flexed back into the holder 5. This flexing motion takes place about the end support pins 4, and is in a direction away from the conveyor belt 2, thereby arching or bowing the center portion 10 of blade 5 inwardly toward the conveyor belt 2, thereby providing better conformance with the conveyor belt 2, and improved cleaning performance. This bowing action lifts the center portion 10 of blade inner edge 8 off of the center support pin 25, as shown in FIG. 5. The outer end portions 9 of blade 5 are in fact supported in a cantilevered fashion from end support pins 4, such that the force applied to blade end portions 9 by the conveyor belt 2 elastically deforms blade 5 to assume an arcuate plan shape. This bowing or flexing action makes the blade 5 self-adjusting or self-regulating, so as to achieve maximum blade conformance at the critical center area of the conveyor belt 2. The contact force between the opposite end portions 9 of blade 5 and the conveyor belt 2 is, through the bowing cantilever flexing of blade 4, redirected to force the center portion 10 of blade 4 into the conveyor belt 2. Hence, even though blade 4 wears most quickly at its center portion 10, good blade conformance is maintained at the center area of the conveyor belt 2. In the worn condition illustrated in FIG. 5, when the scraper 1 is moved away from conveyor belt 4, the inner edge 8 of blade 5 assumes its normal linear condition, supported on each of the support pins 4 and 25, and the outer edge 7 of blade 5 assumes a generally concave shape.

A worn blade 5 can be easily removed from blade holder 3 and replaced, without the need for tools or highly skilled repair personnel. To replace a worn blade 5, the operator simply removes the clip 45 from at least one of the two retainer pins 42, and then withdraws the retainer pin 42 from the plates 15 and 16 of holder 3. Blade 5 can then be easily removed from holder 3 by sliding it outwardly of holder slot 6, out from under the remaining retainer pin 42. Alternatively, both retainer pins 42 can simply be removed from both ends of holder 3. A new blade 5 is then similarly inserted into holder slot 6. Each removed retainer pin 42 is then reinserted in aligned fastener apertures 27, and an associated clip 45 is mounted in place to positively retain scraper 1 in its fully assembled condition. Blade 5 can be easily removed and replaced even when there are large deposits of debris or rust on scraper 1, and/or in difficult environments, such as in underground mines.

The reference numeral 1a (FIGS. 6–10) generally designates another scraper embodying the present invention, having a booster spring 50 associated therewith. Since scraper 1a is similar to the previously described scraper 1, similar parts appearing in FIGS. 1–5 and FIGS. 6–10 respectively are represented by the same, corresponding reference numeral, except for the suffix "a" in the numerals of the latter. In scraper 1a, booster spring 50 is mounted in holder 3a by a pair of S-shaped spring retainers 51. The illustrated booster spring 50 is in the nature of a leaf spring, and has a width substantially commensurate with the width of blade 5, and a length slightly longer than the inner edge 8 of blade 5. Booster spring 50 may be constructed from a spring steel, or other similar material, and is designed to provide additional spring force or flex resistance to blade 5, particularly when scraper 1 is used in conjunction with very wide conveyor belts 2, thereby requiring a long scraper blade 5.

Spring retainers 51 have a substantially identical construction, and are positioned adjacent the opposite ends of blade holder 3a. The spring retainer 51 illustrated in FIGS. 7 and 8 is shown in a pre-assembly condition, and includes a hook-shaped upper end 55, a crimped center portion 56 that forms an inwardly protruding ledge, and a straight lower end 57, which is formed into a hook during assembly, as shown in FIG. 9. Scraper 1a is assembled in the following fashion. Booster spring 50 is inserted into the slot 6a in blade holder 3a, and is abuttingly supported on support pins 4a and 25a. Two spring retainers 51 are positioned adjacent the opposite ends of booster spring 50, with their upper ends 55 engaged over the outermost spacers 24a, and their center ledges 56 positioned over the outward end surfaces of booster spring 50 in the manner illustrated in FIG. 9. The lower ends 57 of spring retainers 51 are then bent back into a hook around the outermost spacers 24a, so as to securely, yet slidably mount booster spring 50 in slot 6a, between the front and rear plates 15a and 16a of blade holder 3a. A blade 5a is then inserted into blade holder 3a, so that its inner edge 8a rests on the outwardly facing surface of booster spring 50. Quick-release retainer pins 42a and clips 45a are then installed in blade holder 3a in the manner similar to that described hereinabove.

During operation, scraper 1a performs in a manner similar to the previously described scraper 1. As shown in FIG. 10, as the center portion of 10a of blade 5a is worn away, the opposite end portions 9a of blade 5a, as well as the opposite end portions of booster spring 50, are flexed back about the end support pins 4a in a direction away from the conveyor belt 2a, thereby arching or bowing the center portion 10a of blade 5a and the center portion of booster spring 50 inwardly toward the conveyor belt 2a for improved conformance and cleaning performance. In the worn condition illustrated in FIG. 10, the center portion of booster spring 50 lifts off of the center support pin 25a. Booster spring 50 imparts additional stiffness or spring force to blade 5a, particularly in very wide scrapers 1a, to insure proper conformance with the conveying surface of the conveyor belt 2a.

The reference numeral 1b (FIGS. 11-15) generally designates another scraper embodying the present invention, having a scraper blade and center mounted booster spring. Since scraper 1b is similar to the previously described scrapers 1 and 1a, similar parts appearing in FIGS. 1-5 and FIGS. 6-10, and FIGS. 11-15 respectively are represented by the same, corresponding reference numeral, except for the suffix "b" in the numerals of the latter. A U-shaped spring retainer 62 is mounted to the center portion of booster spring 50b by fasteners 63. The center support pin 25b is slidingly received within the interior of U-shaped spring retainer 62. In this fashion, spring retainer 62 positively locates booster spring 50b longitudinally within holder 3b, yet permits the center portion of booster spring 50b, as well as the center portion of 10b of blade 5b to float inwardly and outwardly in holder slot 6b, as shown in FIG. 13.

The assembly of scraper 1b (FIGS. 11-15) is similar to that described above with respect to scraper 1, except that booster spring 50b is first positioned in holder slot 6b, and the U-shaped spring retainer 62 is positioned over the center support pin 25b, and attached to booster spring 50b by fasteners 63.

During operation, scraper 1b performs similarly to the previously described scrapers 1 and 1a. As contact between the outer edge of 7b of blade 5b and the conveyor belt 2b wears away the center portion 10b of blade 5b, the outer end portions 9b of blade 5b, as well as the opposite end portions of booster spring 50b, are flexed back about the end support pins 4b in a direction away from the conveyor belt 2b, thereby arching or bowing the center portion 10b of the blade 5b and the center portion of booster spring 50b inwardly toward the conveyor belt for improved conformance and cleaning performance.

Scrapers 1-1b provide a unique conforming belt cleaner, which has improved cleaning performance and efficiency. The longitudinal resiliency of the blades 5-5b, and their sliding mount within holders 3-3b permit the blades 5-5b to arch or bow over holder support pins 4-4b as the blade wears to achieve better conformance with the belt. Quick-change retainer pins 42-42b securely retain the blades 5-5b in their associated holders 3-3b, and are readily detachable to facilitate easy removal and replacement of the same without tools by even unskilled personnel.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A scraper for cleaning conveyor belts and the like, comprising:

an elongate holder including mutually parallel front and rear plates defining a groove therebetween, and at least two support pins extending between said front and rear plates at locations disposed a predetermined distance inwardly from opposite ends of said holder;

an elongate blade mounted in said holder, having opposite side faces closely received in the groove of said holder for sliding movement therein, and opposite end portions positioned adjacent to the opposite ends of said holder; said blade having an outer edge shaped for scraping a belt, an opposite inner edge abuttingly supported on said support pins at locations thereon spaced a predetermined distance inwardly from the end portions of said blade, and a center portion disposed generally centrally in said holder; said blade being resiliently flexible along its length, whereby as contact between the outer edge of said blade and the belt wears away the center portion of said blade, the end portions of said blade are flexed back about said support pins in a direction away from the belt, thereby bowing the center portion of said blade inwardly toward the belt for improved conformance and cleaning performance.

2. A scraper as set forth in claim 1, including:
a quick-change fastener retaining said blade in said holder, and being easily detachable to facilitate replacement of said blade.

3. A scraper as set forth in claim 2, wherein:
said blade has an overall width measured between the opposite end portions of said blade; and
said support pins are positioned in said holder such that the predetermined distance between each of said support pins and the adjacent end portion of said blade is equal to at least ten percent of the overall width of said blade.

4. A scraper as set forth in claim 3, wherein:
said fastener includes a pair of quick-release retainer pins extending between said front and rear plates and capturing said blade in said holder.

5. A scraper as set forth in claim 4, wherein:
said blade includes opposite end edges with outwardly extending tab portions which engage said retainer pins to removably mount said blade in said holder.

6. A scraper as set forth in claim 5, including:
a third support pin extending between said front and rear plates at a location generally intermediate and colinear with said two support pins.

7. A scraper as set forth in claim 6, including:
a booster spring positioned along the inner edge of said blade and providing additional spring force to said blade.

8. A scraper as set forth in claim 7, including:

a plurality of spacers extending between said from and rear plates, and fixedly interconnecting the same in a spaced apart relationship.

9. A scraper as set forth in claim 8, including:
a U-shaped spring retainer connected with said booster spring and slidingly receiving said third support pin therein.

10. A scraper as set forth in claim 8, including:
a pair of S-shaped spring retainers extending between adjacent spacers and including an inwardly projecting ledge which engages opposite ends of said booster spring to retain the same in said holder.

11. A scraper as set forth in claim 10, wherein:
said support pins are positioned in said holder such that the predetermined distance between each of said support pins and the adjacent end portion of said blade is in the range of twenty to forty percent of the overall width of said blade.

12. A scraper as set forth in claim 11, wherein:
said support pins are positioned in said holder such that the predetermined distance between each of said support pins and the adjacent end portion of said blade is equal to around twenty five percent of the overall width of said blade.

13. A scraper as set forth in claim 1, wherein:
said blade has an overall width measured between the opposite end portions of said blade; and
said support pins are positioned in said holder such that the predetermined distance between each of said support pins and the adjacent end portion of said blade is equal to at least ten percent of the overall width of said blade.

14. A scraper as set forth in claim 1, including:
a pair of quick-release retainer pins extending between said front and rear plates and capturing said blade in said holder.

15. A scraper as set forth in claim 1, wherein:
said blade includes opposite end edges with outwardly extending tab portions to removably mount said blade in said holder.

16. A scraper as set forth in claim 1, including:
a third support pin extending between said front and rear plates at a location generally intermediate and colinear with said two support pins.

17. A scraper as set forth in claim 1, including:
a booster spring positioned along the inner edge of said blade and providing additional spring force to said blade.

18. A scraper as set forth in claim 17, including:
a U-shaped spring retainer connected with said booster spring.

19. A scraper as set forth in claim 17, including:
a pair of S-shaped spring retainers including inwardly projecting ledges which engage opposite ends of said booster spring to retain the same in said holder.

20. A scraper as set forth in claim 1, including:
a plurality of spacers extending between said front and rear plates, and fixedly interconnecting the same in a spaced apart relationship.

21. A scraper as set forth in claim 1, wherein:
said blade has an overall width measured between the opposite end portions of said blade; and
said support pins are positioned in said holder such that the predetermined distance between each of said support pins and the adjacent end portion of said blade is in the range of twenty to forty percent of the overall width of said blade.

22. A scraper as set forth in claim 1, wherein:
said blade has an overall width measured between the opposite end portions of said blade; and
said support pins are positioned in said holder such that the predetermined distance between each of said support pins and the adjacent end of said blade is equal to around twenty five percent of the overall width of said blade.

23. A scraper blade for conveyor belt cleaners and the like of the type that include a slotted blade holder with at least two support pins disposed inwardly from opposite ends of the holder; said blade comprising:
opposite side faces shaped to be closely received in the holder for sliding movement therein;
opposite end portions with outwardly extending tabs for engaging fasteners to retain said blade in the holder;
an outer edge shaped for scraping a belt, and an opposite inner edge shaped for abutting support on the support pins at locations spaced inwardly from the opposite ends of said blade;
a center portion disposed generally centrally in said holder; and wherein
said blade is resiliently flexible along its length, whereby as contact between the outer edge of said blade and the belt wears away the center portion of said blade, the end portions of said blade are flexed back about the support pins in a direction away from the belt, thereby bowing the center portion of said blade inwardly toward the belt for improved conformance and cleaning performance.

24. A scraper blade as set forth in claim 23, including:
a booster spring positioned along the inner edge of said blade and providing additional spring force to said blade.

* * * * *